(12) United States Patent
Breuer et al.

(10) Patent No.: US 12,445,828 B2
(45) Date of Patent: Oct. 14, 2025

(54) BUNDLING OF COMMUNICATION CAPABILITIES FOR MULTIPLE SUBSCRIBER IDENTITIES IN A CELLULAR RADIO COMMUNICATION SYSTEM

(71) Applicant: Telit Cinterion Deutschland GmbH, Munich (DE)

(72) Inventors: Volker Breuer, Botzow (DE); Lars Wehmeier, Falkensee (DE)

(73) Assignee: Telit Cinterion Deutschland GmbH, Munich (DE)

( * ) Notice: Subject to any disclaimer, the term of this patent is extended or adjusted under 35 U.S.C. 154(b) by 394 days.

(21) Appl. No.: 18/255,759

(22) PCT Filed: Nov. 30, 2021

(86) PCT No.: PCT/EP2021/083609
§ 371 (c)(1),
(2) Date: Jun. 2, 2023

(87) PCT Pub. No.: WO2022/117577
PCT Pub. Date: Jun. 9, 2022

(65) Prior Publication Data
US 2024/0107290 A1 Mar. 28, 2024

(30) Foreign Application Priority Data

Dec. 3, 2020 (EP) ..................... 20211470

(51) Int. Cl.
*H04W 76/02* (2009.01)
*H04W 8/18* (2009.01)
*H04W 36/08* (2009.01)

(52) U.S. Cl.
CPC ........... *H04W 8/183* (2013.01); *H04W 36/08* (2013.01)

(58) Field of Classification Search
None
See application file for complete search history.

(56) References Cited

U.S. PATENT DOCUMENTS

2014/0086154 A1 3/2014 Sajadieh
2018/0132289 A1* 5/2018 Zhao ..................... H04W 76/16

FOREIGN PATENT DOCUMENTS

WO WO 2015/180134 12/2015
WO WO 2017/136959 8/2017

OTHER PUBLICATIONS

International Search Report for Application No. PCT/EP2021/083609, mailed on Feb. 16, 2022.

* cited by examiner

*Primary Examiner* — Gary Lafontant
(74) *Attorney, Agent, or Firm* — PEARL COHEN ZEDEK LATZER BARATZ LLP

(57) ABSTRACT

A user equipment device for use in a cellular radio communication system, comprising a radio frequency, herein RF, front end, which is configured for RF communication with a base station node of the cellular radio communication system, a communication controller, which is configured to control operation of the RF front end wherein the communication controller is configured to establish an operative signalling connection with a first subscriber identity module, herein SIM, which comprises first subscriber identity information associated with a first subscriber identity, herein first identity to establish an operative signalling connection with a second SIM, which comprises second subscriber identity information associated with a second subscriber identity, herein second identity, that is different from the first identity upon establishing the operative signalling connection with the second SIM, to establish an instance of a protocol stack and to provide to the base station node identity-bundling (Continued)

capability information that is indicative of a shared communication capability provided by the user equipment device via the RF front end and associated with the first identity and with the second identity to subsequently control shared use of the RF front end and shared use of the established instance of the protocol stack in establishing, maintaining and terminating respective radio bearers associated with the first identity and with the second identity, respectively, via the base station node.

16 Claims, 8 Drawing Sheets

BUNDLING OF COMMUNICATION CAPABILITIES FOR MULTIPLE SUBSCRIBER IDENTITIES IN A CELLULAR RADIO COMMUNICATION SYSTEM

CROSS-REFERENCE TO RELATED APPLICATIONS

This application is a National Phase Application of PCT International Application No. PCT/EP2021/083609, International Filing Date Nov. 30, 2021, claiming the benefit of European Patent Application No. 20211470.8, filed Dec. 3, 2020, which are hereby incorporated by reference in their entirety.

FIELD OF THE INVENTION

The present invention relates to a user equipment device for use in a cellular radio communication system, to a method for operating the user equipment device, to a base station node for serving a user equipment device in a radio access network cell of a cellular radio communication system, to a method for operating the base station node, to a mobility management core network node for managing mobility of a user equipment device in a cellular radio communication system, and to a method for operating the mobility management core network node.

In cellular radio communication, before a user can access services provided by a mobile network operator via a user equipment device, such as a mobile phone, the user equipment device has to identify and authenticate itself to the mobile network operator. Commonly, such an identification and authentication is realized by means of a subscriber identity module (SIM) that stores subscriber identity information associated with a subscriber identity. The SIM is connected to the user equipment device in one of various known ways.

In certain circumstances, it is beneficial for the user to be able to use an additional second subscriber identity with the same user equipment device. FIG. 1 and FIG. 2 show different cellular radio communication systems known from the prior art enabling this.

BACKGROUND OF THE INVENTION

FIG. 1 shows a cellular radio communication system 100 according to the prior art comprising a user equipment device 110 that supports the use of two SIMs, in this case referred to as dual-SIM passive operation, which will be explained further below. The cellular radio communication system 100 further comprises a radio access network, of which only a base station node 120 is shown in FIG. 1. Furthermore a first core network 130*a* operated by a first network operator OP1 and a second core network 130*b* operated by a second network operator OP2 are shown.

The user equipment device 110 thus comprises two SIMs, a first SIM 110.2*a* and a second SIM 110.2*b*, and a radio frequency (RF) front end 110.6 with a set of antennas 110.6.1. The first SIM 110.2*a* comprises subscriber identity information indicative of a first subscriber identity associated with the first core network 130*a* of the first network operator OP1 while the second SIM 110.2*b* comprises subscriber identity information indicative of a second subscriber identity associated with the second core network 130*b* of the second network operator OP2.

Furthermore, the user equipment device 110 comprises a communication controller 110, typically comprising a baseband processor connected to the RF front end 110.6 and the two SIMs. The communication controller 110.4 is configured to establish a connection to one of the two core networks via the base station node 120. As illustrated, a radio bearer having radio bearer sections 112*a*, 122*a* associated with the first subscriber identity connects the user equipment device 110 with the core network 130*a*.

The base station node 120 is shared between both network operators OP1 and OP2. The communication controller 110 is configured to establish a radio bearer for only one of the subscriber identities at a time. A SIM-switching device 110.3 establishes, a signaling connection between the communication controller 110 and either the first SIM 110.2*a* or the second SIM 110.2*b*, depending on the user's choice. Thus, before another radio bearer (not shown in FIG. 1) for the second SIM 110.2*b* can be established, the radio bearer 112*a*, 122*a* has to be terminated.

FIG. 2 shows a further cellular radio communication system 200 according to the prior art comprising an alternative user equipment device 210 that supports a dual-SIM-dual-active operation.

Beside the user equipment device 210, the cellular radio communication system 200 comprises the core network 130*a* associated to the network operator OP1 and the core network 130*b* associated to the network operator OP2, which were already described with regard to FIG. 1. Furthermore, in the example depicted in FIG. 2, two base station nodes 220*a* and 220*b* are shown which are associated to the core network 130*a* and 130*b*, respectively.

To support dual-SIM active operation, the user equipment device 210 comprises two RF front ends 210.6*a* and 210.6*b*, each with an independent set of antennas 210.6*a*.1 and 210.6*b*.1, respectively. Both are connected to a communication controller 210.4. Furthermore, in contrast to the user equipment device 110, the communication controller 210.4 which is simultaneously connected to the first SIM 110.2*a* and the second SIM 110.2*b*. As a result of the simultaneous connection of the communication controller 210.4 with the two SIMs and the two independent RF front ends, the user equipment device 210 is configured to establish and maintain radio bearers associated with the two different subscriber identities simultaneously. Thus, a first radio bearer having radio bearer sections 212*a* and 222*a* is associated with the first subscriber identity and connects the user equipment device 210 with the first core network 130*a* via the first base station node 220*a*. A second radio bearer has radio bearer sections 212*b* and 222*b* associated with the second subscriber identity and connects the user equipment device 210 with the second core network 130*b* via the second base station node 220*b*.

SUMMARY OF THE INVENTION

In view of the described prior art, the present invention is to provide an improved cellular radio communication system enabling operation of a user equipment device on behalf of two subscriber identities.

This objective is achieved, in a first aspect of the invention, by a user equipment device according to claim 1. According to a second aspect of the invention, a base station node according to claim 9 is provided. In a third aspect, the present invention provides a mobility management core network node according to claim 11. Moreover, the invention relates, in a fourth aspect, to a method for operating a user equipment device according to claim 14; in a fifth aspect, to a method for operating a base station node according to claim 15; and, in a sixth aspect, to a method for operating a mobility management core network node according to claim 16.

According to the first aspect of the present invention, the user equipment device comprises a radio frequency, herein RF, front end, which is configured for RF communication with a base station node of the cellular radio communication system.

Furthermore, the user equipment device comprises a communication controller, which is configured to control operation of the RF front end. In particular, the communication controller is configured to establish an operative signaling connection with a first subscriber identity module, herein SIM, which comprises first subscriber identity information associated with a first subscriber identity, herein first identity, and to establish an operative signaling connection with a second SIM, which comprises second subscriber identity information associated with a second subscriber identity, herein second identity, that is different from the first identity.

Moreover, the communication controller is configured upon establishing the operative signaling connection with the second SIM, to establish an instance of a protocol stack and to provide to the base station node identity-bundling capability information that is indicative of a shared communication capability provided by the user equipment device via the RF front end and associated with the first identity and with the second identity, and to subsequently control shared use of the RF front end and shared use of the established instance of the protocol stack in establishing, maintaining and terminating respective radio bearers associated with the first identity and with the second identity, respectively via the base station node.

The invention is based on the recognition that in the example shown in FIG. 1 operation of the RF front end 110.6 to establish a radio bearer associated to the second subscriber identity is not possible while the radio bearer 112a, 122a is maintained. Thus, if the core network 130b tries to contact the user equipment device 110 on behalf of the second subscriber identity, for example by paging, the user equipment device 110 would not be able to respond. Furthermore, the invention recognizes that additional hardware expenditure is required in the example shown in FIG. 2 to enable establishing and maintaining radio bearers associated with two different subscriber identities simultaneously. In particular, two RF front ends, each with a separate set of antennas, and establishment of two instances of a protocol stack are required in such a system, so that both identities/SIMs can be active at the same time. In other words, a user equipment device in the system of FIG. 2 is operated like two user equipment devices in one physical box. In comparison, material and manufacturing costs of the user equipment device and its use of energy during operation are reduced. Material and manufacturing costs and energy usage are reduced even more in case of a user equipment device according to the invention that is to be operated with more than two subscriber identities simultaneously.

In this context, the shared radio-frequency front end requires a single RF hardware, including an RF chipset and a minimum set of transmission and reception antennas for use under a cellular radio communication standard in serving a user equipment device, as would be required for a user equipment device that is associated with only a single subscriber identity. As is per se known, the subscriber identity information provided by the SIM is used to identify a subscriber in a cellular radio communication system to a network operator.

The user equipment device of the present invention achieves the described advantages in that it requires only a single RF front end, but at the same time allows a truly shared use of this RF front end between different subscriber identities. To allow shared use of the RF front end for two (or more) subscriber identities, the user equipment device comprises a communication controller that is configured to establish an operative signaling connection to two or, in some embodiments, even more than two different SIMs, each SIM comprising subscriber identity information associated with a different respective subscriber identity In accordance with the present invention, the communication controller is configured to establish, upon establishing the operative signaling connection with the second SIM, an instance, that is to say, a single instance of a protocol stack and to use it to provide to a base station node identity-bundling capability information that is indicative of a shared communication capability provided by the user equipment device via the RF front end and associated with the first identity and with the second identity.

Thus, once there are two SIMs with an established operative signaling connection with the communication controller, the communication controller triggers the instance of the protocol stack for allowing a signaling exchange with a base station to be used for radio access network services. By sending the identity-bundling capability information, it provides information to the base station node about the shared communication capability associated with the first identity and with the second identity. This allows the base station node to use this shared communication capability information in establishing, maintaining or terminating respective radio bearers associated with the first subscriber identity or with the second subscriber identity. In other words, the base station node is informed to enable shared use of the RF communication and mobility services provided to the user equipment by the two identities. As will be explained further below, the identity-bundling capability information allows the base station to provide services such as a common handover process for the bundled identities irrespective of their given affiliations with the same or with different core network operators.

Subsequently, the communication controller controls shared use of the RF front end and shared use of the established single instance of the protocol stack for both subscriber identities in establishing, maintaining and terminating respective radio bearers associated with the first identity and with the second identity, respectively, via the base station node.

The solution of the present invention does not require coordination between core network operators while the two subscriber identities are being served. In the following, preferred embodiments of the user equipment device will be described.

The invention is not limited to serving only two subscriber identities in the described manner. Different embodiments of the user equipment device support the bundling of more than two subscriber identities. To this end, the communication controller is configured to establish an operative signaling connection with a correspondingly higher number of SIMs, and to provide to the base station node identity-bundling capability information that is indicative of a shared communication capability provided by the user equipment device via the RF front end and associated with the corresponding number of identities. In order to maintain guaranteed quality of service levels, an upper limit of the number of subscriber identities involved in such bundling may be defined for a given type of user equipment device hosting the bundled operation of multiple SIMs.

The SIMs can be implemented by any suitable device that provides subscriber identity information to the communication controller. This includes known SIM implementations, such as any known type of SIMs, in particular Universal SIM (USIM) and embedded SIM (eSIM).

Moreover, an operative signaling connection between the communication controller and the first or second SIM can be implemented by a wired or by a wireless signaling channel. In particular, a given SIM may or may not be comprised by the user equipment device itself. In particular, one of the SIMs may be not be part of the user equipment device, but of an external second user equipment device.

Thus, in one embodiment implementing the wireless solution the user equipment device comprises a wireless-communication interface for establishing the operative signaling connection with the second SIM. The wireless-communication interface is connected with the communication controller. This embodiment is particularly useful in which the second SIM is part of another user equipment device. The wireless-communication interface is then used by the user equipment device for accessing the subscriber identity information via the other device. It is known for example from user equipment devices mounted in an automotive vehicle to ask upon detection whether a detected second SIM of a second mobile user equipment device which earlier was installed shall be connected operatively and await a user input for confirmation.

Bundling is thus preferably triggered and executed upon detection of the second SIM and in one embodiment requires user confirmation that resource sharing with the second SIM or identity is allowed.

An advantageous application case of the present invention is related to its use in an automotive vehicle. In this application case, the user equipment device of the present invention is mounted into the vehicle, typically at production of the vehicle. The vehicular-mounted RF front end of the user equipment comprises an antenna set for a single identity, formed by one transmitter antenna and two receive antennas. The vehicle-mounted user equipment device has only the first SIM representing a first identity. The first SIM is typically integrated into the vehicle as an eSIM. The second SIM in this application case is that of an external second user equipment device that is not mounted to the vehicle. Such second user equipment device is for instance a handheld mobile phone or other portable user equipment device of the driver or of a passenger of the vehicle. Such second user equipment device need not be in accordance with the present invention, but only support a connection between the communication controller of the vehicle-mounted user equipment device and of the second SIM of the second user equipment device, which represent a second identity. Such a connection is suitably established by known means via a wired or via a wireless connection. A suitable wireless connection is for instance a Bluetooth connection between the vehicle-mounted user equipment device and the external second user equipment device.

The arrangement of this application case allows the second user equipment device to obtain a share in using the vehicular-mounted RF front end and the instance of the protocol stack established by the communication controller of the vehicular-mounted user equipment device in establishing, maintaining and terminating respective radio bearers associated with the second identity, respectively, via the base station node that serves the vehicular-mounted user equipment device. This application case shows that the invention enables car manufacturers to keep the number of vehicular-mounted antennas to a single set, which is required for serving only one identity. On the other hand, the second user equipment device can profit from the shared use of this antenna set, which typically has much better radiation performance than antennas of a handheld devices carried inside a car, which are affected by attenuation by the body of the car. Thus, both user equipment devices listening to paging and signaling of one network may are able to receive a message from their respective core network. This reduces the signaling amount via the air interface due to avoidance of paging or signaling escalations.

In one embodiment of the user equipment device, the communication controller is additionally configured to ascertain unified communication capability parameters including a single set of quality-of-service key performance indicators (KPIs) allocated to each of the first and second identities by the base station node. Different KPIs relate to the accessibility of radio access bearers for a given identity, to the RAN contribution to the end-user impact on the retainability of communication services, to latency in the delivery of IP packets, to availability in the sense of a percentage of time that the wireless service is available for the given identity, to mobility in terms of handover success rate, to bandwidth allocation and bandwidth protection for a given identity, and to a priority its routing. In a preferred embodiment, the quality of service KPIs including at least a notification control, the flow bit rate and aggregate bit rates are ascertained by the communication controller as unified communication capability parameters allocated to both, the first and second identity by the base station node. These parameters are per se known from 5G NR standards. Other known quality-of-service KPIs relate to an allocation and retention priority (ARP), to a reflective QoS Attribute (RQA), to a notification control, to flow bit rates, to aggregate bit rates, default values, and to a maximum packet loss rate.

For Guaranteed Bit Rate (GBR) QoS flows only, additional QoS parameters are Guaranteed Flow Bit Rate (GFBR) and Maximum Flow Bit Rate (MFBR), applicable for Uplink and Downlink. Here, the GFBR denotes the bit rate that is guaranteed to be provided by the network to the QoS Flow over an Averaging Time Window. The MFBR limits the bit rate to the highest bit rate that is expected by the QoS Flow (e.g. excess traffic may get discarded or delayed by a rate shaping or policing function at the UE, RAN, UPF)

According to embodiments of the present invention each SIM is associated with a GFBR and an MFBR. The sum of the respective amounts of the given quantity never exceeds the shared communication capability provided by the user equipment device via the RF front end and associated with the first and second identities. Only when both GFBRs are less than a total capability, MFBR will be performed. Prior to shaping or lowering the GFBR that is associated or the GFBR that is associated with the second Identity, any MFBR of the two identities will be subject for rate shaping first.

Preferably, the guaranteed bit rate for both identities remains constant, and only the maximum flow bit rate MFBR is reduced. This is also related to the case where a user 1 has a GBR bearer and a non-GBR bearer up to the radio capabilities associated with a first identity of the user equipment device. When a user 2 sets-up a GBR bearer associated with the second identity, the non-GBR bearer will be reduced either by the user equipment device itself or by the network.

By ascertaining the unified communication capability parameters, the communication controller can ensure that the shared communication capabilities of the RF front end are used such that the quality-of-service key performance indicators allocated to each subscriber identity are fulfilled as much as possible.

The ascertaining of the unified communication capability parameters is performed differently by different variants of the embodiment described above.

In one variant of the embodiment, the communication controller of the user equipment device is configured to internally determine the unified communication capability parameters using the first and second subscriber identity information, and to provide them to the base station node. By using the subscriber identity information, which is stored on the SIM, in determining at least a part of the unified communication capability parameters internally, network traffic produced by determining the unified communication capability parameters in exchange with other parts of the cellular radio communication system is reduced.

In another variant, which can be used in addition or as an alternative to the variant just described, the communication controller of the user equipment device is configured to receive the unified communication capability parameters from the base station node. Receiving the unified communication capability parameters from the base station node requires additional storage capabilities in the cellular radio communication system externally of the user equipment device. However, it allows a faster update of those information, because its availability is not dependent on an operation status of the user equipment device.

As mentioned, in other variants of the above described embodiment, the two variants described above are combined for determining different parts of the unified communication capability parameters externally and internally.

To avoid or mitigate situations of possibly conflicting parallel service requests by the two or more identities, another preferred embodiment provides the communication controller with additional management functions. In particular, the communication controller is configured
- to receive, from an application process associated with the first or second identity, an application data bearer request, which is directed to establishing an application data bearer and which includes a requested application quality-of-service level; and
- observing quality-of-service limitations associated with the respective first or second identity and observing quality-of-service requirements of any pre-established application data bearer, to determine and assign to the application data bearer request an application quality-of-service level equal to or lesser than the requested application quality-of-service level, and
- to establish the requested application data bearer with the assigned application quality-of-service level in a signaling exchange with the base station node.

By observing quality-of-service limitations associated with the first or the second identity and observing quality-of-service requirements of any pre-established application data bearer in determining for the application data bearer request an application quality-of-service level, the communication controller ensures that by the establishment of any additional application data bearer for the requesting identity the quality-of-service level assigned to pre-established application data bearers for the other identity are not violated.

The bundling of communication capabilities for multiple subscriber identities enables particularly advantageous schemes for mobility management. The mobility in connected mode, i.e. during an ongoing session is done by the network via handover command. The core network determines the target base station node based on RF parameters but also cell loading and other circumstances, i.e. suitability for providing a special ongoing service. In an idle mode a change of the base station node is determined based mainly on received RF signals and signaled cell priorities. However, in an embodiment of the present invention, these mechanisms are harmonized for the case that both identities are currently in different states, i.e. connected and idle. In particular, after the bundling according to the present invention has been established, situations may occur, in which one subscriber identity is in an active mode, and another subscriber identity is in an idle mode. To maintain the bundling of shared communication capabilities for the multiple subscriber identities even under motion of the user equipment device across different cells of the radio access network, the communication controller is preferably configured, in performing a handover process or in performing a radio-resource control (RRC) signaled cell change process while the first or second identity is in an idle mode, after providing to the base station node the unified communication capability information, to prioritize selection of an identical new base station node for serving both the first identity and the second identity over the cell which was identified and indicated by the network controlled mobility mechanism, i.e. handover or cell change. By prioritizing the selection of an identical new base station node regardless whether the first or second identity are in different RRC states, e.g., connected or idle for all bundled subscriber identities, the communication controller prevents a loss of the established shared use of radio communication capabilities by both identities.

In yet another embodiment, the communication controller is configured, upon determining that the operative signaling connection with the second SIM is lost, to determine and provide to the base station node communication capability information associated with only the first SIM. In case the operative signaling connection to the second SIM is lost, the RF front end is no longer shared between the first and the second SIM. By informing the base station about this loss by providing the communication capability information associated with only the first SIM, the communication controller ensures that the full bandwidth of the RF front end is used for radio bearers associated with the first identity while any data bearers associated with the second subscriber identity are terminated, and that any coupling of the two identities in the mobility management is released.

In the following, the base station node for serving a user equipment device in a radio access network cell of a cellular radio communication system according to the second aspect of the invention is described.

The base station node comprises a first base station control communication interface for exchanging mobility control information with one or more mobility management core network nodes of the cellular radio communication system for establishing, maintaining or terminating one or more radio bearers associated with at least one subscriber identity that is associated with a user equipment device.

Moreover, the base station node comprises a second base station control communication interface for exchanging mobility control information with one or more user equipment devices of the cellular radio communication system for establishing, maintaining or terminating the one or more radio bearers associated with the at least one subscriber identity.

Furthermore, the base station node comprises a base-station control unit, which is configured, upon receiving via the first or second base-station control communication interface identity-bundling capability information that is associated with a first subscriber identity and with a second subscriber identity and that is indicative of a shared communication capability provided by the user equipment device via a RF front end of the user equipment device, to use the shared communication capability information in establishing, maintaining or terminating respective radio bearers associated with the first subscriber identity or with the second subscriber identity.

The base station node of the second aspect of the invention provides complementary functionality on the side of a cellular radio access network for handling the identity-bundling capability of the user equipment device of the first aspect of the present invention. It is thus particularly well suited for establishing, maintaining and terminating radio bearers for a user equipment device that supports the described concept of sharing of its RF front end between at least two subscriber identities. To that end, the base station node, upon receiving from the user equipment device the identity-bundling capability information uses it in establishing, maintaining or terminating respective radio bearers associated with the first subscriber identity and with the second subscriber identity.

In the following, preferred embodiments of the base station node will be described.

Different embodiments of the base station node adhere to different standards of cellular radio communication and are typically referred to under different names in such different standards. Exemplary embodiments of the base station node are configured to operate in accordance with a standard widely known as "3G" and are called "NodeB", or in accordance with a "4G" standard and are called "eNodeB", or in accordance with a "5G" standard and are called New Radio (NR) base station or gNodeB.

In one embodiment, the base station control unit is additionally configured to forward mobility control information, which was received from a given user equipment device via the second base station control communication interface, to one or more mobility management core network nodes via the first base station control communication interface. Through the forwarding of mobility control information to any relevant mobility management core network nodes, the base station node ensures that relevant core network nodes are correctly informed, among others, about the use of shared communication capability of the given user equipment device.

In a preferred embodiment of the base station node, the base-station control unit is configured to provide to the mobility management core network node via the first base-station control communication interface or to the user equipment device via the second base-station control communication interface an identity-bundling support capability indicator indicative of the capability of the base station node to control the shared use of the shared communication capability provided by the user equipment device. This way, information on the availability of identity-bundling support by the base station node can be provided before additional signaling is performed. Particularly, in a cell reselection process initiated by the user equipment device or in a handover process initiated by the mobility management core network node, only those base station nodes can be selected among all base station nodes available in a cell reselection process or a handover process that fulfill necessary identity-bundling capabilities.

In the following, the mobility management core network node, herein MME node, for managing mobility of a user equipment device in a cellular radio communication system according to the third aspect of the invention will be described.

The MME node comprises a first and a second MME-node control communication interface as well as a mobility control unit.

The first MME-node control communication interface is configured for exchanging mobility control information with a base station node of the cellular radio communication system for establishing, maintaining or terminating one or more radio bearers associated with a subscriber identity that is associated with a user equipment device.

The second MME-node control communication interface is configured for exchanging mobility control information with one or more peer mobility management core network nodes of the cellular radio communication system for establishing, maintaining or terminating the one or more radio bearers.

Moreover, the mobility control unit is configured, upon receiving via the first or second control communication interface identity-bundling capability information, which is indicative of a user equipment device being associated with a first subscriber identity and with a second subscriber identity and which is indicative of a shared communication capability provided by the user equipment device via its RF front end and associated with the first identity and with the second identity, to execute the following tasks:
  to associate the identity-bundling capability information with the first and second subscriber identities, with the user equipment device, and with the base station node; and
  to control shared use of the shared communication capability via the base station node and the RF front end of the user equipment device in establishing, maintaining or terminating respective radio bearers associated with the first subscriber identity and with the second subscriber identity, respectively.

The MME node improves performance of known MME nodes by providing the capability to establish radio bearers associated with different subscriber identities via a single base station node according to the second aspect of the present invention to a single user equipment device of the first aspect of the present invention. To this end, the MME node, upon receiving from a base station node or another MME node the identity-bundling capability information indicative of a shared use of the RF front end of the user equipment device between the first and the second subscriber identity, is configured to associate the identity-bundling capability information with the first and second subscriber identities, with the user equipment device, and with the base station node. In other words, the MME node is configured to store an association of the first and second subscriber identities, the user equipment device, and the base station node with the identity-bundling capability information for operative use in performing mobility management for the subscriber identities. In particular it uses this association to control shared use of the shared communication capability via the base station node and the RF front end of the user equipment device in establishing, maintaining or terminating respective radio bearers associated with the first subscriber identity and with the second subscriber identity, respectively. This implies that the subscriber identities are coupled for the purpose of mobility management procedures, irrespective of whether or not the coupled subscriber identities are associated with the same core network operator. In other words, the MME node applies the same mobility management operations to the coupled subscriber identities so as to maintain their coupling, by controlling the provision of radio access network services through the same base station node for both subscriber identities even through handover and cell reselection processes.

In the following embodiments of the MME node of the third aspect will be described.

In one preferred embodiment of the MME node, the mobility control unit is configured, upon receiving the identity-bundling capability information, to assign to the first and second subscriber identities respective serving temporary mobile subscriber identities, which comprise identity-bundling information indicative of the shared communication capability provided by the user equipment device via the RF front end and associated with the first subscriber identity and with the second subscriber identity. By including at least a part of the identity-bundling capability information into the serving temporary mobile subscriber identities, base station nodes or peer MME nodes are made aware of the shared communication capability of the user equipment device without requiring a separate control signaling exchange to ascertain or communicate the identity bundling of the user equipment device.

Correspondingly, further embodiments of the base station node of the second aspect have their base-station control unit provided with the additional capability of extracting the identity-bundling capability information from a received serving temporary mobile subscriber identity and to subsequently use the extracted identity-bundling capability information to determine the shared communication capability of the user equipment device associated with the respective subscriber identities in establishing, maintaining or terminating respective radio bearers associated with the first subscriber identity and/or with the second subscriber identity.

In another preferred embodiment, the mobility control unit is configured, in controlling a handover process involving a transfer of mobility control information from the MME node to a selected one of the peer mobility management core network nodes while the first or second identity is in an active mode, to provide to the selected one of the peer mobility management core network nodes the identity-bundling capability information associated with the first and second identity. This forwarding of the identity-bundling capability information during a handover process from one MME node to the selected next MME node, which is to take over the mobility management for the subject user equipment device and the coupled subscriber identities, allows a maintaining support of the identity bundling through the given user equipment device by the cellular radio communication system.

In the following, the method for operating a user equipment device according to the fourth aspect of the invention will be described. The method comprises:

establishing an operative signaling connection with a first subscriber identity module, herein SIM, which comprises first subscriber identity information associated with a first subscriber identity, herein first identity;

establishing an operative signaling connection with a second SIM, which comprises second subscriber identity information associated with a second subscriber identity, herein second identity, that is different from the first identity;

upon establishing the operative signaling connection with the second SIM, establishing an instance of a protocol stack and providing to the base station node identity-bundling capability information that is indicative of a shared communication capability provided by the user equipment device via the RF front end and associated with the first identity and with the second identity; and subsequently controlling shared use of the RF front end and shared use of the established instance of the protocol stack in establishing, maintaining and terminating respective radio bearers associated with the first identity and with the second identity, respectively via the base station node.

The method according to the fourth aspect of the invention shares the advantages of the user equipment device according to the first aspect of the invention.

In the following, the method for operating a base station node in serving a user equipment device in a radio access network cell of a cellular radio communication system according to the fifth aspect of the invention will be described. The method comprises the following steps:

receiving identity-bundling capability information that is indicative of a shared communication capability provided by a user equipment device via its RF front end and a single instance of a protocol stack and that is associated with a first subscriber identity and with a second subscriber identity, and using the shared communication capability provided by the user equipment device in establishing, maintaining or terminating respective radio bearers associated with the first subscriber identity and with the second subscriber identity, respectively.

The method for operating a base station node according to the fifth aspect of the invention shares the advantages of the base station node according to the second aspect of the invention.

In the following, a method for operating a mobility management core network node, herein MME node, according to the sixth aspect of the invention will be described. The method comprises the following steps:

receiving identity-bundling capability information, which is indicative of a user equipment device being associated with a first subscriber identity and with a second subscriber identity and which is indicative of a shared communication capability provided by the user equipment device via its RF front end and associated with the first identity and with the second identity;

associating the unified communication capability information with the first and second subscriber identities, with the user equipment device, and with the base station node; and controlling shared use of the shared communication capability via the base station node and the RF front end of the user equipment device in establishing, maintaining or terminating respective radio bearers associated with the first subscriber identity and with the second subscriber identity, respectively.

The method for operating a MME node according to the sixth aspect of the invention shares the advantages of the MME node according to the third aspect of the invention.

A seventh aspect of the present invention is formed by an arrangement that includes a base station node of the second aspect of the invention and an MME node of the third aspect of the present invention. An embodiment of this arrangement additionally includes at least one user equipment device of the first aspect of the present invention.

An eighth aspect of the present invention is formed by a method that forms a combination of the methods of the fifth and sixth aspects of the invention. An embodiment of this method additionally includes the method of the third aspect of the invention.

A ninth aspect of the present invention is formed by a computer program comprising executable code for controlling a processor of a user equipment device to perform a method according to the fourth aspect of the present invention.

A tenth aspect of the present invention is formed by a computer program comprising executable code for controlling a processor of a base station node to perform a method according to the fifth aspect of the present invention.

An eleventh aspect of the present invention is formed by a computer program comprising executable code for controlling a processor of a MME node to perform a method according to the sixth aspect of the present invention.

DESCRIPTION OF THE DRAWINGS

Further embodiments will be described in the following with reference to the enclosed drawings. First an overview of the Figures is given, while further below a detailed description of the Figures is provided.

The detailed description of the Figures starts by providing an overview of a cellular radio communication system that forms an arrangement in accordance with the present invention, and a more detailed description of an embodiment of a user equipment device according to the invention.

Figure 1:
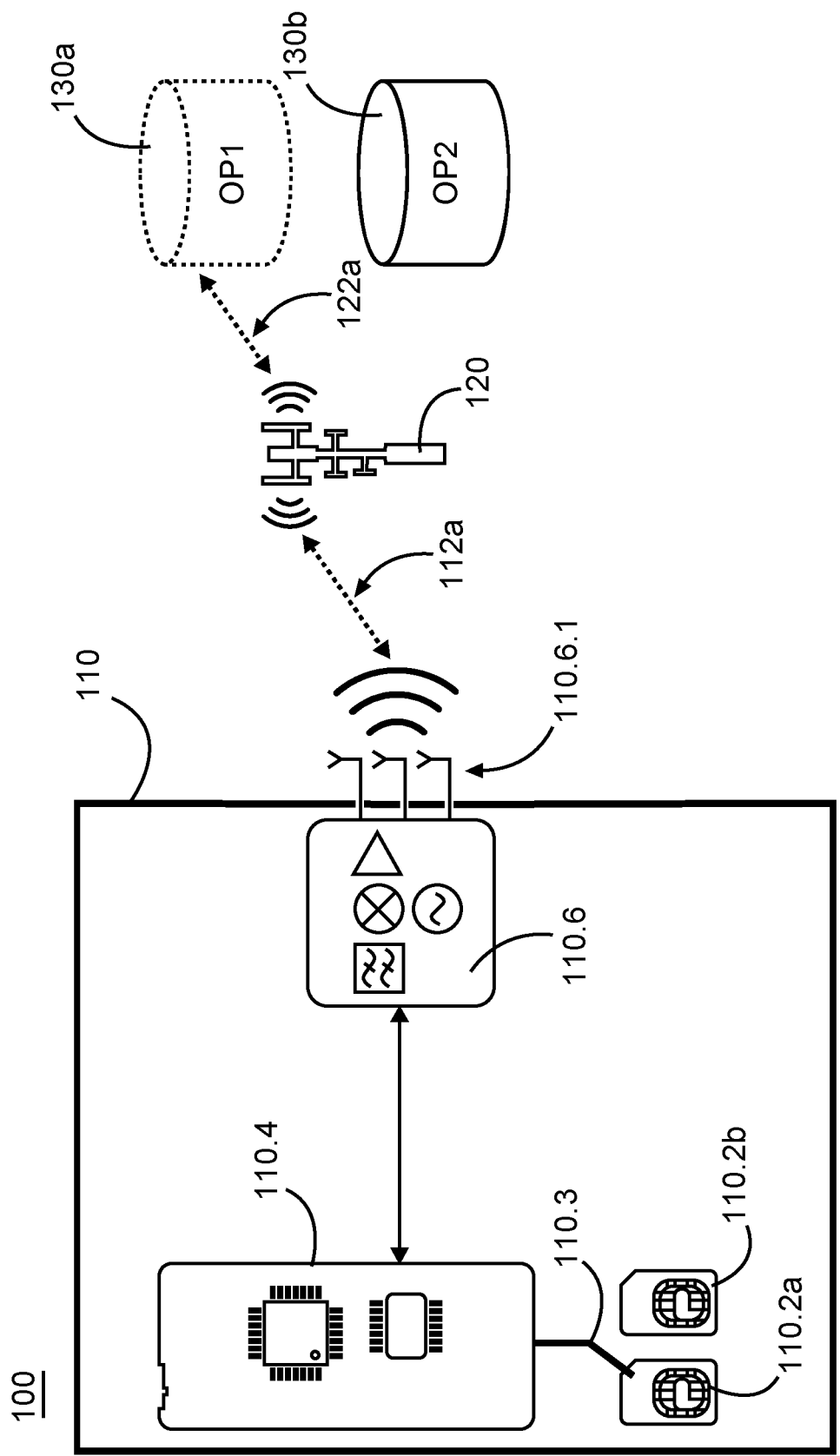
FIG. 1 shows a cellular radio communication system according to the prior art comprising a user equipment de-vice that is configured for dual-SIM-passive operation.
Figure 2:
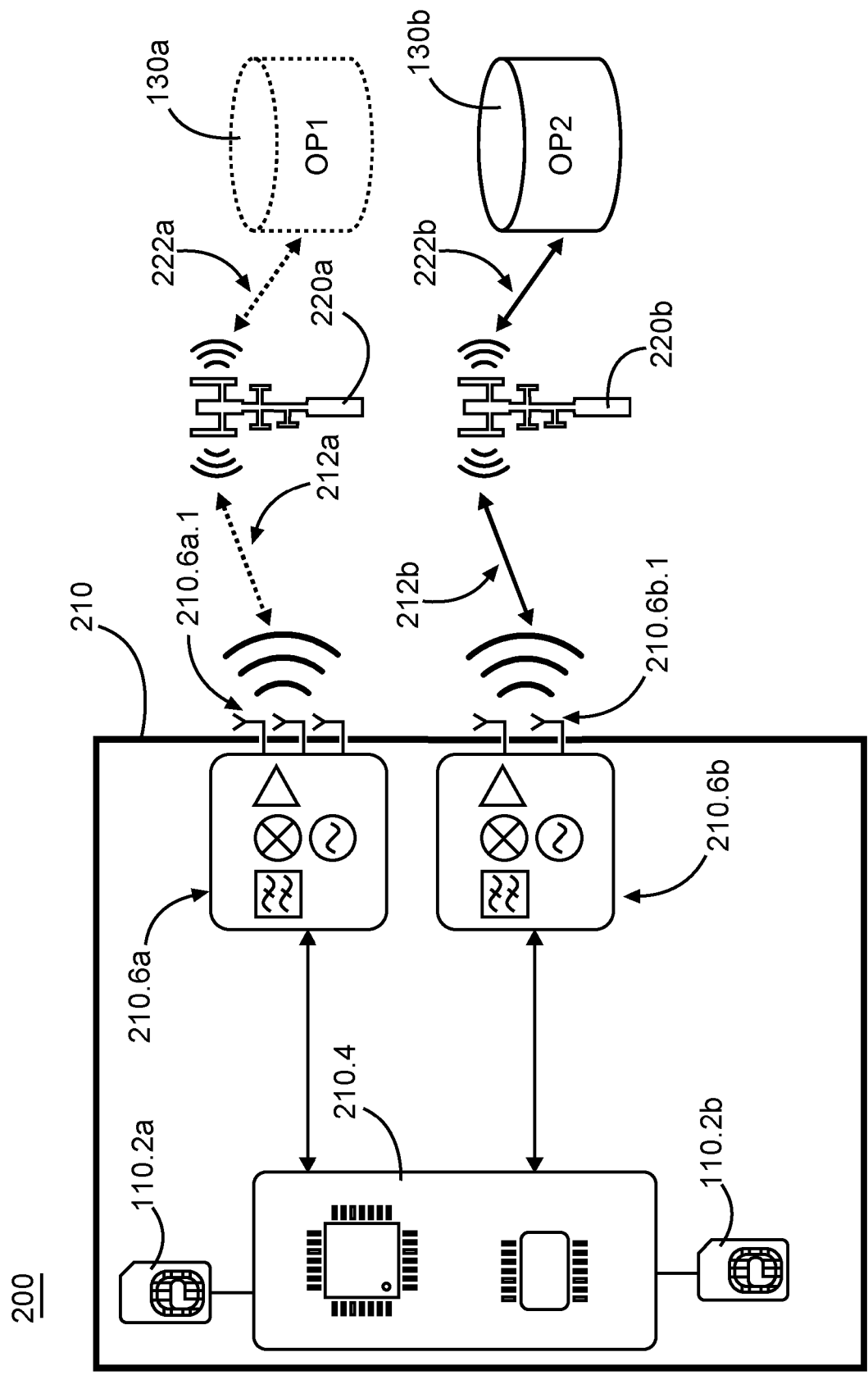
FIG. 2 shows a cellular radio communication system according to the prior art comprising an alternative user equipment device that supports a dual-sim-active operation
Figure 3:
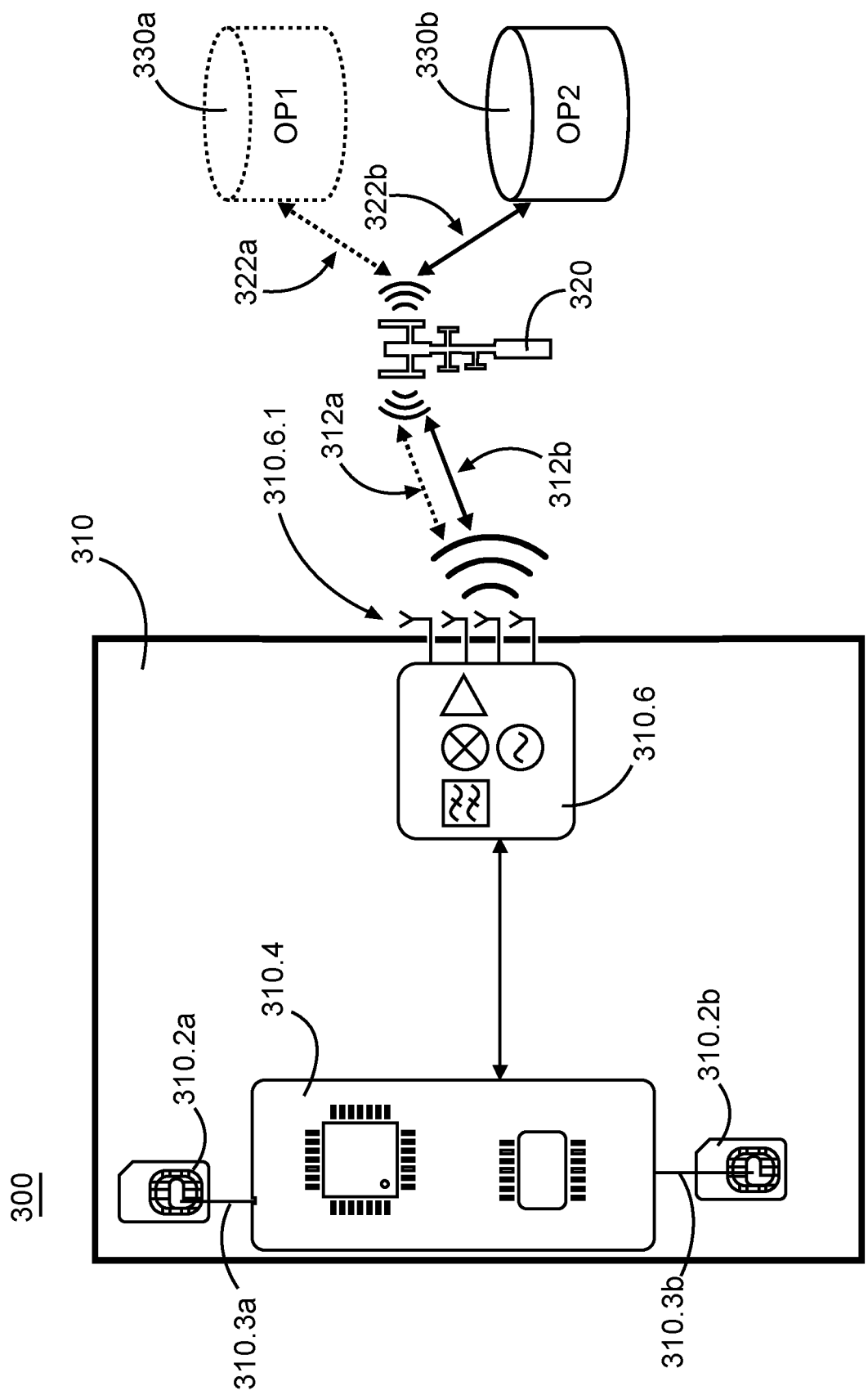
FIG. 3 shows a cellular radio communication system comprising a user equipment device according to the present invention.

FIG. 3 shows a cellular radio communication system 300 comprising a user equipment device 310 according to the present invention.

The cellular radio communication system 300 comprises a number of core networks operated by different network operators of which are only two shown in FIG. 3. A first core network 330$a$ is operated by a network operator "OP1", which a second core network 330$b$ is operated by a network operator "OP2". The core networks 330$a$ and 330$b$ are each connected to a number of base station nodes, which each serve an individual cell of the cellular radio communication system 300. FIG. 3 shows in an exemplary manner only one of those base station nodes, base station node 320, which is used by the core network 330$a$ and by the core network 330$b$. Furthermore, FIG. 3 shows a user equipment device 310 this is located within the cell of the base station node 320.

The user equipment device 310 comprises a radio frequency (RF) front end 310.6. The RF front end 310.6 comprises a single RF hardware, including an RF chipset and a single set of transmission and reception antennas 310.6.1. The user equipment device 310 further comprises a communication controller 310.4, often also referred to as base-band processor, which is configured to control operation of the RF front end 310.6.

Moreover, the user equipment device 310 comprises a first subscriber identity module (SIM) 310.2$a$ and a second SIM 310.2$b$, which each comprises an electrically erasable programmable read-only memory (EEPROM) for storing first subscriber identity information, such as an international mobile subscriber identity, associated with a first subscriber identity and second subscriber identity information associated with a second subscriber identity, respectively. The communication controller 310.4 is configured to establish an operative signaling connection 310.3$a$ and 310.3$b$ with the first SIM 310.2$a$ and with the second SIM 310.2$b$, respectively, for accessing the respective subscriber identity information. While in FIG. 3, the first SIM 310.2$a$ and the second SIM 310.2$b$ are each depicted as a Universal Integrated Circuit Card (UICC), other embodiments of the user equipment device comprise SIMs in a different form, such as embedded SIMs or as software-based SIMs.

The RF front end 310.6 corresponds to an RF front end that is normally used in user equipment devices of the prior art that only use a single subscriber identity to connect to a core network of the cellular radio communication system. Therefore, as long as an operative signaling connection is established only to the first SIM 310.2$a$, operation of the user equipment device 310 does not differ to that of user equipment devices from the prior art. However, when an operative signaling connection to the first SIM 310.2$a$ and the second SIM 310.2$b$ is established, the user equipment device 310 is configured to provide a shared use of the RF front end 310.6 between the first subscriber identity and the second subscriber identity, wherein user equipment device 310 allows a parallel use of network services of the cellular radio communication network 300 associated with the first subscriber identity and the second subscriber identity.

To this end, the communication controller 310.4 is configured, upon establishing an operative signaling connection 310.3$b$ with the second SIM 310.2$b$, to establish an instance of a protocol stack and to provide to the base station node 320 identity-bundling capability information that is indicative of a shared communication capability provided by the user equipment device via the RF front end 310.6 and associated with the first identity and with the second identity.

Additionally, the communication controller 310.4 is configured to subsequently control shared use of the RF front end 310.6 and shared use of the established instance of the protocol stack in establishing, maintaining and terminating respective radio bearers associated with the first identity and with the second identity, respectively via the base station node 320.

The identity-bundling capability information indicate to the base station node 320 that the user equipment device 310 uses the RF front end 310.6 in parallel to access services of the cellular radio communication network 300 using the first subscriber identity and the second subscriber identity. As will be described in detail further below, the base station node 320 receives the identity-bundling capability information and is configured to use the shared communication capability provided by the user equipment device in establishing, maintaining or terminating respective radio bearers associated with the first subscriber identity and with the second subscriber identity. As a result, the user equipment device 310 is connected to the base station node 320 in parallel using the first identity and the second identity. In other words, the RF front end 310.6 of the user equipment device 310 and the base station node 320 form a combination of a multiplexer and a demultiplexer for transmitting information between the user equipment device 310 via the base station node 320 to other parts of the cellular radio communication network 300.

In the example shown in FIG. 3, the first identity is associated with a network operator "OP1" and the second identity is associated with a network operator "OP2". A first radio bearer with radio bearer sections 312a and 322a connects the user equipment device 310 with the core network 330a via the base station node 320 using the first subscriber identity. Furthermore, a second radio bearer with radio bearer sections 312b and 322b connects the user equipment device 310 with the core network 330a via the base station node 320 using the second subscriber identity. Alternatively, in case that the base station node 320 only serves to the core network of the network operator associated to one of the subscriber identities of the user equipment device 310, the other subscriber identity could be connected to the core network of the associated network operator through a roaming mechanism.

Additionally, the user equipment device 320 is configured to ascertain unified communication capability parameters including a single set of quality-of-service key performance indicators (KPIs) allocated to each of the first and second identities by the base station node. In the user equipment device 310 shown in FIG. 3, the unified communication capability parameters are part of the subscriber identity information stored in the EEPROM of each SIM and the communication controller 310.4 is configured to internally determine the unified communication capability parameters using the first and second subscriber identity information, and to provide them to the base station node 320. However, in other embodiments of the user equipment device, the communication controller is configured to receive the unified communication capability parameters from the base station node 320. Yet, in other embodiments of the user equipment device, parts of the unified communication capability parameters are ascertained internally while other parts of the unified communication capability parameters are received from the base station node 320. For example, the quality-of-service KPIs may include for user equipment devices operating under the 5G standard a 5G QoS identifier (SGQI), an allocation and retention priority (ARP), reflective QoS attribute (RQA), notification control, flow bit rates comprising guaranteed flow bit rate and maximum flow bit rate for guaranteed-bit-rate QoS flows, aggregate bit rates, default values, and maximum packet loss rate.

In FIG. 3, only those components of the user equipment device 320 are shown that are absolutely necessary for the shared use of the RF front end 310.6 using the first and the second subscriber identity, while other components were left out for simplicity. In the following, another embodiment of the user equipment device will be described with reference to FIG. 4 that comprises further components required for the shared use of the RF front end 310.6 to available on an application level.

Figure 4:
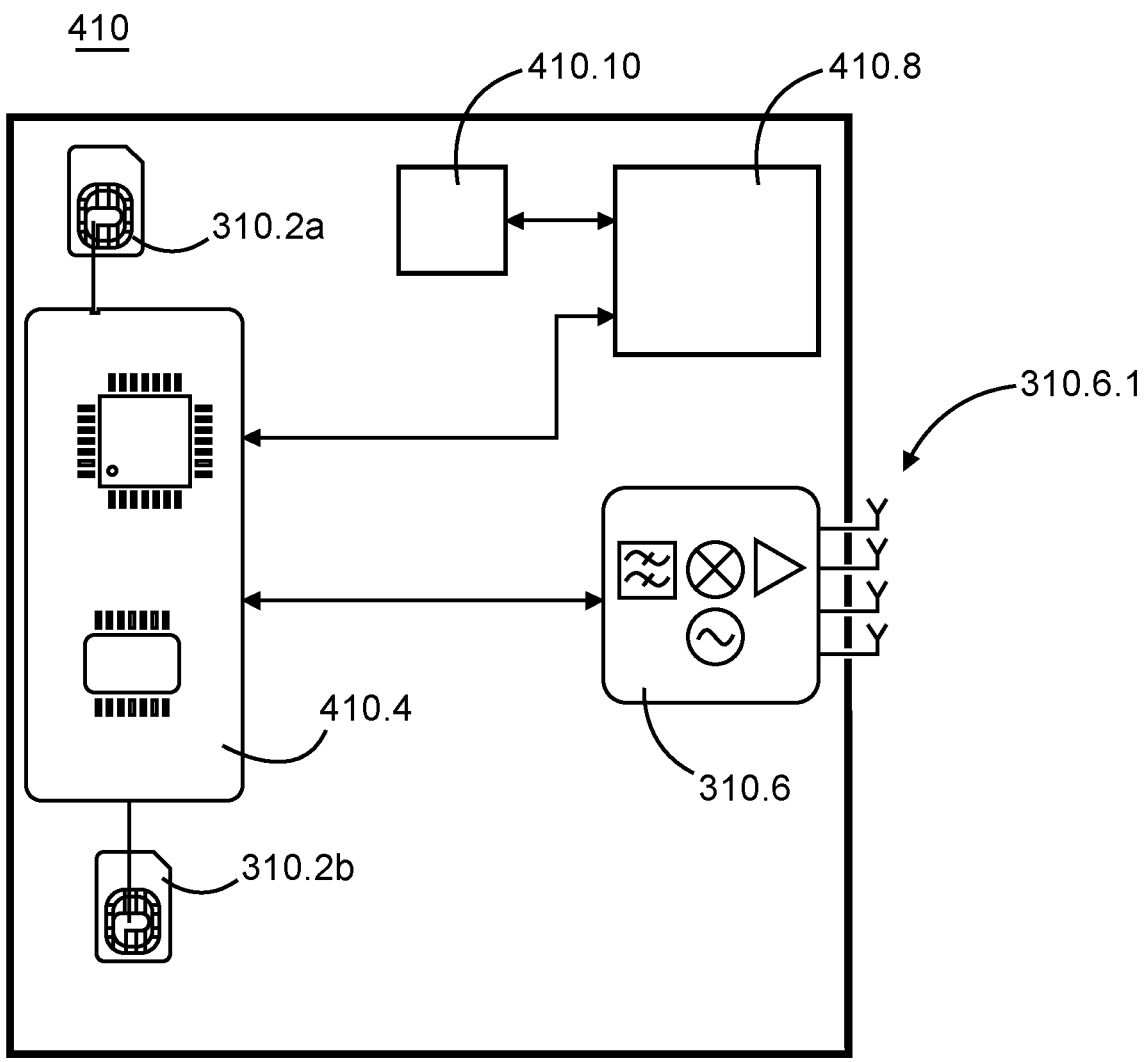
FIG. 4 shows an alternative embodiment of the user equipment device comprising a communication controller that is additionally configured to process application data bearer request from an application process.

FIG. 4. shows an alternative embodiment 410 of the user equipment device additionally comprising a communication controller that is configured to process application data bearer requests from an application process.

The user equipment device 410 is in large parts identical to the user equipment device 310 of FIG. 3. Accordingly, all components of the user equipment device 410 that are comprised by the user equipment device 310, are identified in FIG. 4 with identical reference signs. For brevity, the reader is referred to the description of FIG. 3 for a detailed explanation of those components. In the following, only those components will be explained that are unique to the user equipment device 410.

In comparison to the user equipment device 310, the user equipment device 410 additionally comprises an application memory 410.10 for storing an application program code of an application to be executed by the user equipment device 410. Furthermore, the user equipment device 410 comprises an application processor unit 410.8, which is connected to the application memory 410.10 and a communication controller 410.4. The application processor unit 410.8 is configured to load and execute as an application process the application program code of the application stored in the application memory 410.10. Moreover, the application processor unit 410.8 is configured to associate the application process with the first or the second subscriber identity, depending on the application process, and to send a request for establishing an application data bearer associated to the first or the second subscriber identity to the communication controller 410.4. In addition, the application processor unit 410.8 is configured to include into the application data bearer request an application quality-of-service level. In the embodiment of the user equipment device 410, the application quality-of-service level is indicative of a quality-of-service class, wherein each quality-of-service class is associated to quality-of-service limitations such as a priority, a packet delay budget, and a packet error loss rate. Additionally, the application quality-of-service level specifies a minimum bandwidth (for guaranteed-bite-rate bearers) and a maximum bandwidth of the requested application data bearer.

The communication controller 410.4 is configured to receive the application data bearer request. Furthermore, the communication controller 410.4 is configured, with regard to quality-of-service limitations associated with the first or second subscriber identity and quality-of-service requirements of any pre-established application data bearers, to determine and assign to the application data bearer request an application quality-of-service level equal to or lesser than the requested application quality-of-service level.

For example, if a sum of bandwidths used by the pre-established application data bearers together with the maximum bandwidth of the requested application data bearer exceed a maximum bandwidth that can be handled by the shared RF front end, the communication controller 410.4 is configured to reduce the requested bandwidth of the application data bearer. Alternatively, if the requested application data bearer is a guaranteed-bite-rate data bearer or has a higher priority than the pre-established application data bearers, the communication controller 410.4 is configured to reduce the bandwidths of the pre-established application data bearers taking into account any of quality-of-service limitations associated with the pre-established application data bearers.

For instance, in the case of the 5G mobile communication standard, the communication controller 410.4 is configured to limit a cumulative guaranteed flow bit rate and a cumulative maximum flow bit rate of all data flows associated to the first subscriber identity or the second subscriber identity to not exceed a maximum bit rate associated the shared RF front end 310.6, wherein a reduction of the maximum flow bit rate takes priority of a reduction of any guaranteed flow bit rates.

Furthermore, the communication controller 410.4 of some of the embodiments of the user equipment device 410 that support the 5G standard is configured to limit a cumulative maximum bit rate for each identity for all non-guaranteed-bit-rate sessions such that the aggregate maximum bit rate for each identity is not exceeded. In this case, the aggregate maximum bit rate is an aggregate maximum bit rate per identity. For example, the communication controller 410.4 would not allow an establishment of a non-GBR session for the first subscriber identity, if the aggregate maximum bit rate associated to that identity would be exceeded, even though the aggregate maximum bit rate associated to the second subscriber identity and the shared RF front end 410.6 would still provide enough bandwidth.

Lastly, the communication controller 410.4 is configured to establish the requested application data bearer with the assigned application quality-of-service level in a signaling exchange with the base station node 320.

In the following, another embodiment of the user equipment will be described with regard to FIG. 5.

Figure 5:
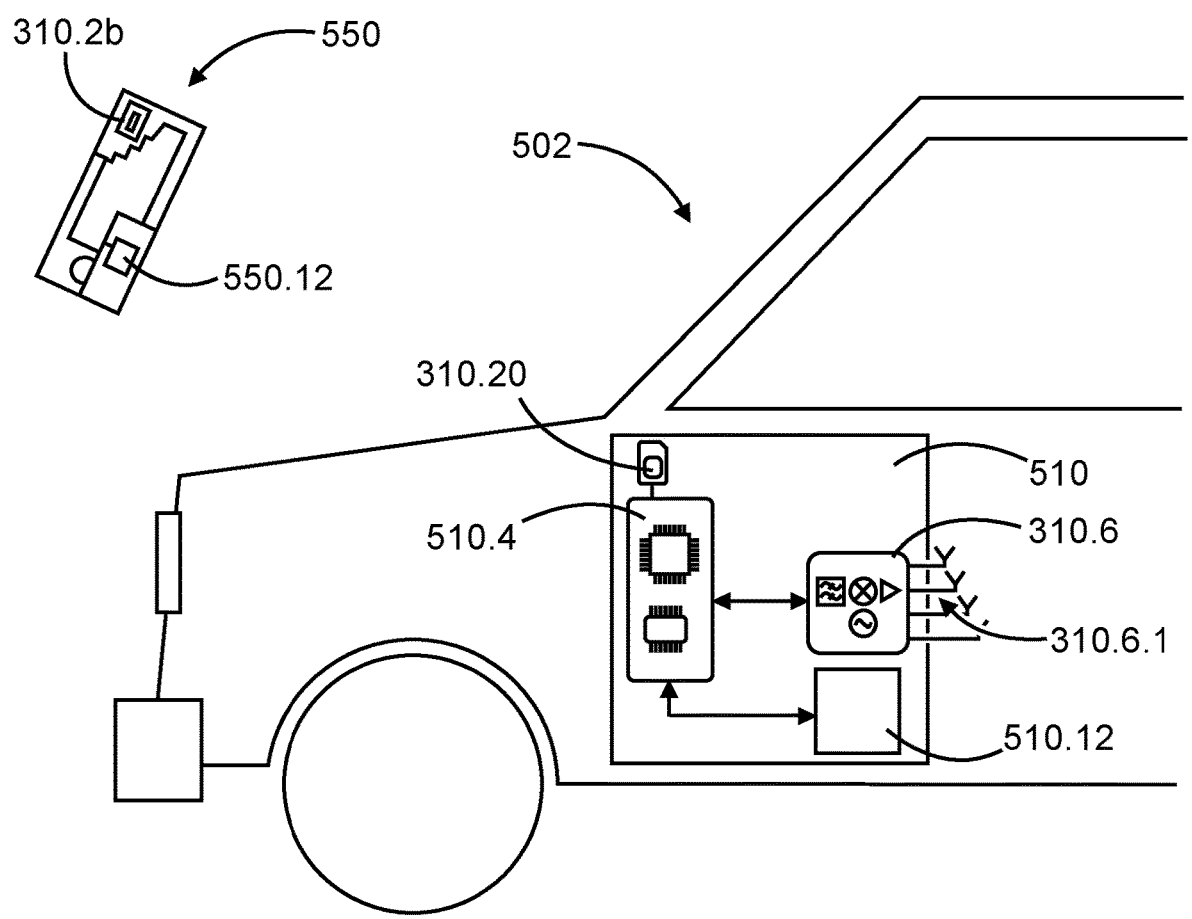
FIG. 5 shows a user equipment device arrangement 500 comprising a host user equipment device and a guest user equipment device, wherein the host user equipment device 510 is part of a vehicle.

FIG. 5 shows a user equipment device arrangement 500 comprising a host user equipment device 510 and a guest user equipment device 550, wherein the host user equipment device 510 is part of a vehicle 502.

The host user equipment device 510 is largely similar to the user equipment device 310 and comprises the RF front end 310.6 with the set of antennas 310.6.1 that is connected to a communication controller 510.4. Furthermore, the communication controller 510.4 is connected the first SIM 310.2a. However, in contrast to the previously described user equipment devices of FIG. 3 and FIG. 4, the user equipment device 510 does not comprise the second SIM 310.2b. Instead, the user equipment device 510 comprises a Bluetooth interface 510.12, which is connected to the communication controller 310.4, as an additional wireless-communication interface. The Bluetooth interface 510.12 is configured to establish a connection to the guest user equipment device 550, which comprises the second SIM 310.2b and also a Bluetooth interface 550.12. For example, in the embodiment of the vehicle 502 shown in FIG. 5, the guest user equipment device 550 is configured to transfer its credentials including its subscriber identity information via Bluetooth to the host user equipment device 510. Subsequently, all radio services, including those for the guest user equipment device 550, like paging or call are received by the host user equipment device 550. In some of those embodiments, the passenger of vehicle 502 may use the speaker, microphone, or any other input or output device of the vehicle 502 for using services associated to the second subscriber identity, such as for example making or receiving calls.

In the example, the guest user equipment device 550 corresponds to the user equipment device of one of the passengers of the vehicle 502. While the guest user equipment device 550 comprises an own RF front end (not shown in the Figure), due to an attenuation of radio waves within the car, it is advantageous for the guest user equipment device 550 to use the RF front end of the vehicle 502. To this end, the communication controller 510.4 is configured to establish an operative signaling connection via the Bluetooth interface 510.12 to the second SIM 310.2b for accessing the subscriber identity information of the second SIM 310.2b comprised in the guest user equipment device 550. In some embodiments of the vehicle 502, an operative signaling connection is established upon detection of the presence of the guest user equipment device 550. In other embodiments, at least a confirmation via the host user equipment device 510 is required to allow resource sharing with said guest user equipment device 550.

Other embodiments of the host user equipment device 510 also allow setting up operative signaling connections to more than one guest user equipment devices.

As the second SIM 310.2b is not always connected to the host user equipment device 510, the communication controller 510.4 is configured, upon determining that the operative signaling connection with the second SIM 310.2b is lost, to determine and provide to the base station node 320 communication capability information associated with only the first SIM 310.2a. To this end, the communication controller 510.4 is configured to send a user capability information message to the base station node 320 with a cause "Coupling released" to indicate that the communication capabilities associated with the RF front end 510.6 are solely used by the first subscriber identity.

Other embodiments of the host user equipment device 510 and the guest user equipment 550 comprise, instead of the Bluetooth interfaces 510.12 and 550.12, a wireless-communication interface based on a different wireless communication standard, such as ZigBee or WiFi.

The FIGS. 3-5 mainly illustrated those situations, when the user equipment device is connected to a single base station node. However, for mobile communication devices a frequent change of the base station node is common. In the following, another embodiment of the user equipment device will be described that is configured to perform a reselection process to change the base station node, which is particularly adapted to the situation wherein the RF front end is shared between two subscriber identities.

Figure 6:
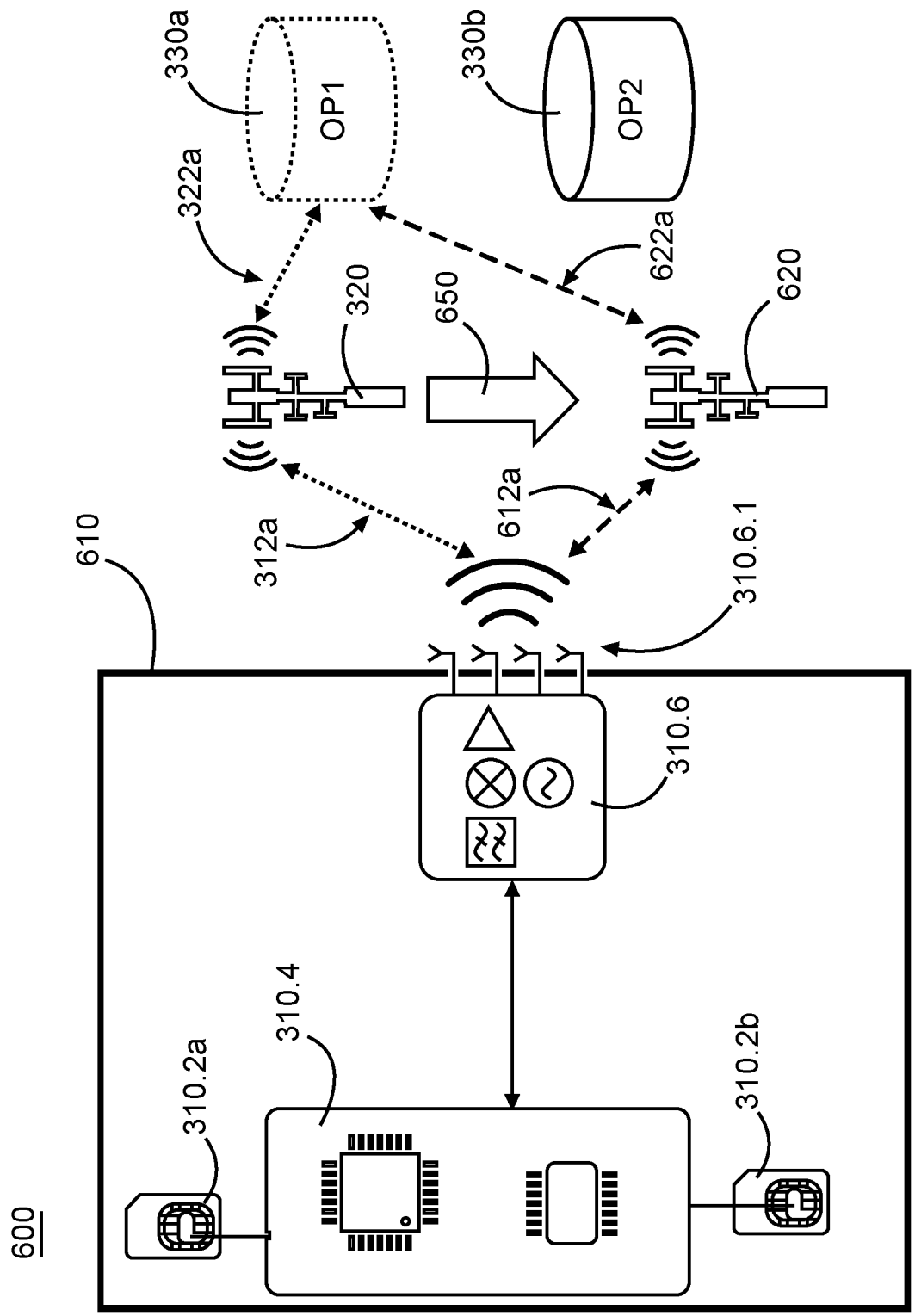
FIG. 6 shows a cellular radio communication system comprising a user equipment device comprising a communication controller that is configured to perform a reselection process.

FIG. 6 shows a cellular radio communication system 600 comprising a user equipment device 610 comprising a communication controller 610.4 that is configured to perform a reselection process.

The user equipment device 610 and the cellular radio communication system 600 comprise components that were already described with regard to FIGS. 3-5. In FIG. 6 and are labeled using identical reference signs and will not be described again below. The reader is referred to the description of those components given with regard to the Figures described above.

The user equipment device 610 comprises a communication controller 610.4, which is connected to the RF front end 310.6 with the set of antennas 610.8. Furthermore, the collocation controller 610.4 is connected to the first SIM 310.2a and the second SIM 310.2b.

In the example shown in FIG. 6, a radio bearer is established between the user equipment device 610 and the core network 330a via the base station 320 indicated by radio bearer sections 312a and 322a. The application data bearer is associated to the first subscriber identity, while the user equipment device 610 is in an idle state with regard to the second subscriber identity.

Furthermore, FIG. 6 depicts that moment, when a handover process is performed by the core network 330a and the radio bearer associated to the first subscriber identity is rerouted from the base station node 320 to a new base station node 620 as indicated by an arrow 650. Radio bearer sections 612a and 622a indicate a newly established radio bearer via base station node 620, which is predetermined to take over a transmission of the radio bearer via base station 320. To prevent a situation in which the base station node associated with the first subscriber identity and the base station node associated with the second subscriber identity differ, the communication controller 620 is configured, in case of a handover procedure involving an active subscriber identity, to perform a cell reselection procedure for an idle subscriber identity that prioritizes that base station node used for the transmissions associated with the active subscriber identity. To that end, the protocol stack established for both subscriber identities by the communication controller 610.4 is configured to assign priority to the base station node 620 assigned to the active subscriber identity by the core network 330a. Furthermore, as the new base station node for the idle subscriber identity is determined by the handover process, the user equipment device 610 is configured to refrain from a signal-strength measurement for the idle subscriber identity during a cell reselection process for the idle subscriber identity that is triggered by a handover process for the active subscriber identity.

Moreover, the communication controller 610 is configured, if the user equipment device 610 is in an idle state associated with both subscriber identities, to perform a cell reselection process in which during an identical base station node is selected for both subscriber identities, to avoid situations in which the subscriber identities camp on different cells. To this end, the user equipment device 610 is configured to use identical cell-reselection-triggering parameters and an identical cell-ranking criterion for the first subscriber identity and the second subscriber identity. Also, the user equipment device is configured to perform a signal strength measurement during the cell reselection process only for one of the subscriber identities.

After FIGS. 3-6 primarily focused on different embodiment of the user equipment device, the following description now focusses on those parts of the cellular radio communication network that have to be adapted such that the embodiments of the user equipment device introduced above are able to establish parallel connections associated with the first and the second subscriber identity using the shared communication capabilities. The base station node 320 of FIG. 3 that fulfills this requirement will be described in more detail in the following with reference to FIG. 7.

Figure 7:
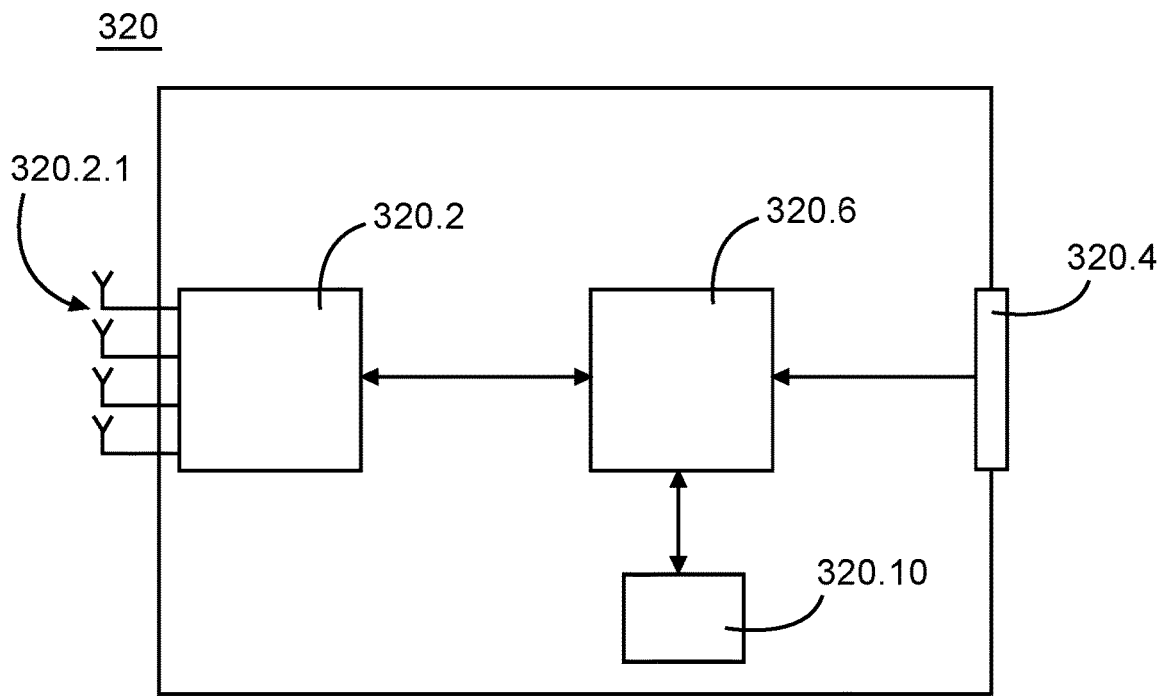
FIG. 7 shows a detailed illustration of the embodiment of the base station node 320 of FIG. 3.

FIG. 7 shows a detailed illustration of the embodiment of the base station node 320 of FIG. 3.

The base station node 320 comprises a RF transmission unit 320.2, which serves as a first base station control communication interface, with a plurality of RF antennas 320.2.1. Through the RF transmission unit 320.2, the base station node 320 is configured to establish radio bearers to a one or more user equipment device located inside a cell associate to the base station node 320.

In addition, the base station node 320 comprises a core-network-node interface 320.4 as a second base station control communication interface for connecting the base station node 320 to any nodes of one or more core networks that the base station node is associated with. In particular, the core-network-node interface 320.4 is configured to connect the base station node 320 to one or more mobility management core network (MME) nodes of the associated core networks.

Furthermore, the base station node 320 comprises a base-station control unit 320.6 that is configured, upon receiving via the first or second base-station control communication interface identity-bundling capability information associated with a first subscriber identity and with a second subscriber identity and that is indicative of a shared communication capability provided by a given user equipment device located within the cell of the base station node 320, to store the unified communication capability information in association with the first and the second subscriber identity and a reference to the given user equipment device in a base-station memory unit 320.10. Moreover, the base station control unit 320.6 is configured to use the information stored in the base-station memory unit 320.10 in establishing, maintaining or terminating radio bearers associated with the first subscriber identity and with the second subscriber identity in accordance with the shared communication capability of the given user equipment device, respectively.

Furthermore, to simplify a handover process or a reselection process, the base-station control unit 320.6 is configured to provide via the core-network-node interface 320.4 to any MME node or via the RF transmission unit to any user equipment device an identity-bundling support capability indicator indicative of the capability of the base station node to support the shared communication capability provided by a given user equipment device.

In order for the shared communication capability of a given user equipment device to be used in parallel by two different subscriber identities, also the core network that the user equipment device is connected to has to support the shared communication capability. Particularly relevant in this regard are mobility management core network nodes, hereinafter also referred to as MME node. In the following, an exemplary MME node that supports these capabilities is described.

Figure 8:
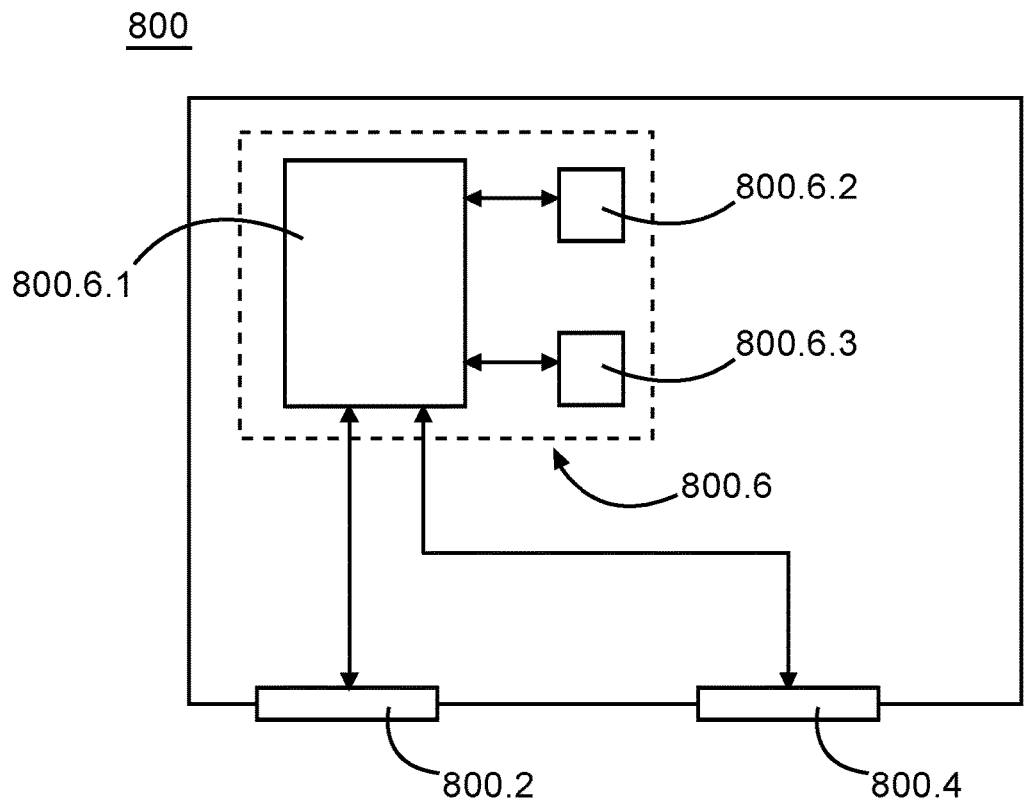
FIG. 8 shows a mobility management core network node that is part of the core network of FIG. 3.

FIG. 8 shows a mobility management core network node 800 that is part of the core network 330a of FIG. 3.

The MME node 800 comprises a first MME-node control communication interface 800.2 for exchanging mobility control information with base station nodes connected to the core network 330a for establishing, maintaining or terminating one or more radio bearers associated with a subscriber identity that is associated with a user equipment device.

Furthermore, the MME node 800 comprises a second MME-node control communication interface 800.4 for exchanging mobility control information with one or more peer mobility management core network nodes of the core network 330a, for example as a result of a tracking area update, for establishing, maintaining or terminating the one or more radio bearers.

Moreover, the MME node 800 comprises a mobility control unit 800.6. The mobility control unit 800.6 comprises a mobility-control processor unit 800.6.1. The mobility-control processor unit 800.6.1 is configured, upon receiving via the first control communication interface 800.2 or second control communication interface 800.4 identity-bundling capability information, to associate the identity-bundling capability information with a first and a second subscriber identities, with a given user equipment device, and with a given base station node. Furthermore, the mobility-control processor unit 800.6.1 is configured to store the associated information in a mobility-control memory unit 800.6.2, which is also part of the mobility control unit 800.6.

Likewise, the mobility-control processor unit 800.6.1 is configured to use the information stored in the mobility-control memory unit 800.6.2 to control shared use of the shared communication capability via a given base station node and the RF front end of the user equipment device in establishing, maintaining or terminating respective radio bearers associated with the first subscriber identity and with the second subscriber identity, respectively.

As part of establishing, maintaining or terminating respective radio bearers associated with the first and the second subscriber identity, some embodiments of the MME node are configured to perform a tracking area update process for one of the subscriber identity as part of the handover process for the other subscriber identity. This is particularly advantageous in those situations, in which, for example, the first subscriber identity is active, the other subscriber identity is idle, and the user equipment device gets moved from a current cell to a new cell, which is not part of the current tracking area of the user equipment device. In this situation, the mobility-control processor unit 800.6.1 is configured to move transmission of any radio bearers from a base station node associated with the current cell to a base station node associated with the new cell. Since the second subscriber identity is idle, the MME node does not need to move any radio bearers associated with the second subscriber identity. However, since the second subscriber identity moved outside of its current tracking area, a tracking area update is required.

By initiating the tracking area update on behalf of the second subscriber identity on the side of the MME node, the otherwise required control communication between the user equipment device and base station nodes and core network is reduced.

Additionally, the mobility control unit 800.6 comprises a STMSI-generating unit 800.6.3. The STMSI-generating unit 800.6.3 is connected to the mobility-control processor unit 800.6.1 and is configured, upon receiving the identity-bundling capability information, to assign to the first and second subscriber identities respective serving temporary mobile subscriber identities (STMSI). In particular, the STMSI-generating-unit 800.6.3 is configured to generate respective STMSIs, wherein each of the STMSIs comprises information indicative of the subscriber identity of the other identity.

In the following, the methods for operating a user equipment device, the base station node, and the MME node will be described with reference to FIGS. 9-11.

Figure 9:
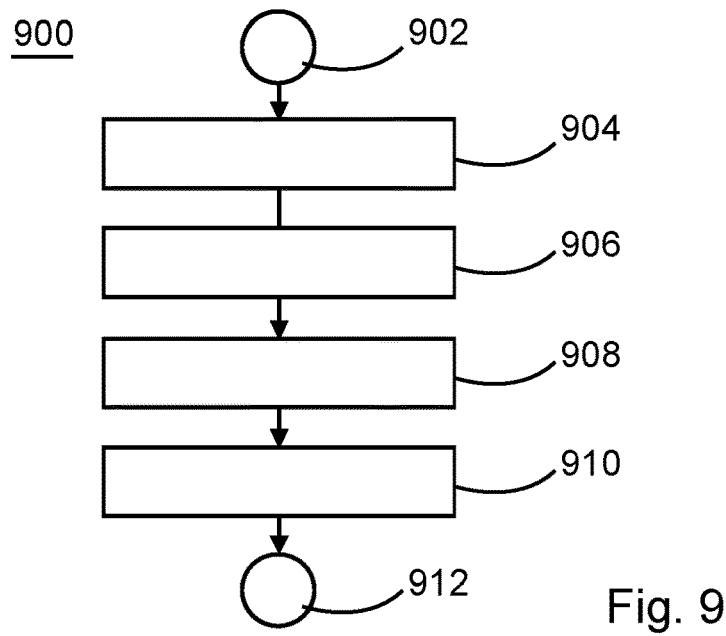
FIG. 9 shows a flow diagram of a method for operating a user equipment device.

FIG. 9 shows a flow diagram of a method 900 for operating a user equipment device.

The method 900 start with a start terminal 902 indicating a start of the method 900 and comprises four steps.

In a first step 904, an operative signaling connection with a first subscriber identity module, herein SIM, which comprises first subscriber identity information associated with a first subscriber identity, herein first identity, is established.

In a second step 906, an operative signaling connection with a second SIM, which comprises second subscriber identity information associated with a second subscriber identity, herein second identity that is different from the first identity is established.

A third step 908 is executed upon establishing the operative signaling connection with the second SIM and after establishing the operative signaling connection with the second SIM. In this third step 908, an instance of a protocol stack and providing to the base station node identity-bundling capability information that is indicative of a shared communication capability provided by the user equipment device via the RF front end and associated with the first identity and with the second identity is established.

In a subsequent fourth step 910, shared use of the RF front end and shared use of the established instance of the protocol stack in establishing, maintaining and terminating respective radio bearers associated with the first identity and with the second identity, respectively, via the base station node is controlled.

This last step 910 is continuously executed until the operative signaling connections to one of the SIMs is lost. Then, the method ends at a stop-terminal 912 following the fourth step 910.

Figure 10:
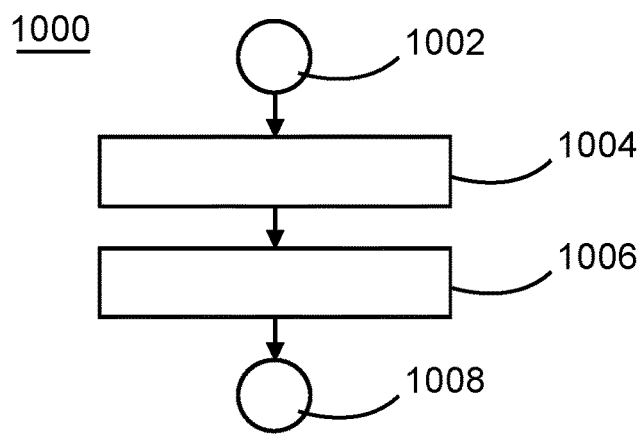
FIG. 10 shows a flow diagram of a method for operating a base station node in serving a user equipment device in a radio access network cell of a cellular radio communication system.

FIG. 10 shows a flow diagram of a method 1000 for operating a base station node in serving a user equipment device in a radio access network cell of a cellular radio communication system.

The method 1000 start with a start terminal 1002 and comprises to steps.

In a first step 1004, identity-bundling capability information that is indicative of a shared communication capability provided by a user equipment device via its RF front end and a single instance of a protocol stack and that is associated with a first subscriber identity and with a second subscriber identity are received by the base station node.

In a second step 1006, the shared communication capability provided by the user equipment device are used in establishing, maintaining or terminating respective radio bearers associated with the first subscriber identity and with the second subscriber identity, respectively.

The second step 1006 is continuously executed until the base station node receives information indicating that the RF front end of the user equipment is not shared between two different subscriber identities anymore. Then, the method 1000 ends with a stop terminal 1008.

Figure 11:
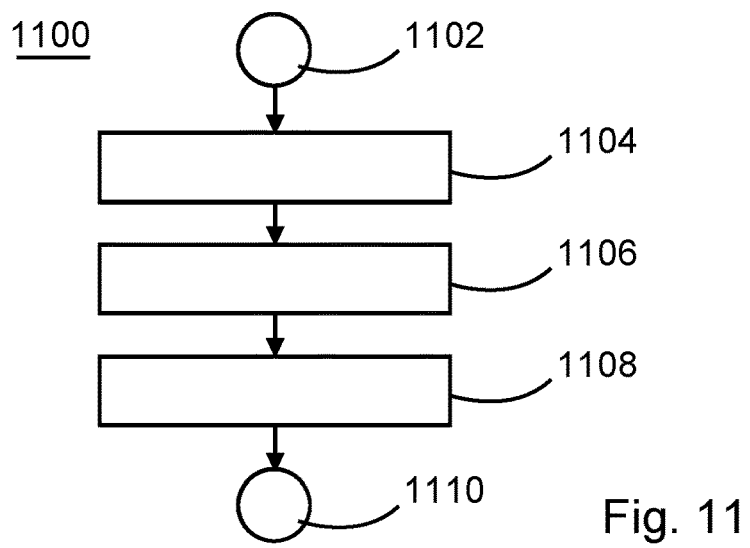
FIG. 11 shows a flow diagram of a method for operating a mobility management core network node, herein MME node.

FIG. 11 shows a flow diagram of a method 1100 for operating a mobility management core network node, herein MME node. The method 1100 starts with a start terminal 1102 and comprises three steps.

In a first step 1104, identity-bundling capability information, which is indicative of a user equipment device being associated with a first subscriber identity and with a second subscriber identity and which is indicative of a shared communication capability provided by the user equipment device via its RF front end and associated with the first identity and with the second identity are received by the MME node.

In a second step 1106, the identity bundling communication capability information are associated by the MME node with the first and second subscriber identities, with the user equipment device, and with the base station node.

In a subsequent step 1108, the MME controls shared use of the shared communication capability via the base station node and the RF front end of the user equipment device in establishing, maintaining or terminating respective radio bearers associated with the first subscriber identity and with the second subscriber identity, respectively. The step 1108 is executed continuously until the MME node receives information indicating that the RF front end of the user equipment is not shared between two subscriber identities anymore. Subsequently, the method 1100 stops with a stop terminal 1110.

The invention claimed is:

1. A user equipment device for use in a cellular radio communication system, comprising:
  a radio frequency, herein RF, front end, which is configured for RF communication with a base station node of the cellular radio communication system;
  a communication controller, which is configured to control operation of the RF front end; wherein the communication controller is configured:
    to establish an operative signalling connection with a first subscriber identity module, herein SIM, which comprises first subscriber identity information associated with a first subscriber identity, herein first identity;
    to establish an operative signalling connection with a second SIM, which comprises second subscriber identity information associated with a second subscriber identity, herein second identity, that is different from the first identity;
    upon establishing the operative signalling connection with the second SIM, to establish an instance of a protocol stack and to provide to the base station node identity-bundling capability information that is indicative of a shared communication capability provided by the user equipment device via the RF front end and associated with the first identity and with the second identity;
    to subsequently control shared use of the RF front end and shared use of the established instance of the protocol stack in establishing, maintaining and terminating respective radio bearers associated with the first identity and with the second identity, respectively, via the base station node.

2. The user equipment device of claim 1, wherein the communication controller is configured to ascertain unified communication capability parameters including a single set of quality-of-service key performance indicators allocated to each of the first and second identities by the base station node.

3. The user equipment device of claim 2, wherein the communication controller is configured to internally determine the unified communication capability parameters using the first and second subscriber identity information, and to provide them to the base station node.

4. The user equipment device of claim 2, wherein the communication controller is configured to receive the unified communication capability parameters from the base station node.

5. The user equipment device of claim 1, wherein the communication controller is configured:
  to receive, from an application process associated with the first or second identity, an application data bearer request, which is directed to establishing an application data bearer and which includes a requested application quality-of-service level; and
  observing quality-of-service limitations associated with the respective first or second identity and observing quality-of-service requirements of any pre-established application data bearer, to determine and assign to the application data bearer request an application quality-of-service level equal to or lesser than the requested application quality-of-service level, and to establish the requested application data bearer with the assigned application quality-of-service level in a signalling exchange with the base station node.

6. The user equipment device of claim 1, wherein the communication controller is configured, in performing a handover process, or in performing a radio-resource control signalled cell change process while the first or second identity is in an idle mode, after providing to the base station node the unified communication capability information, to prioritize selection of an identical new base station node for serving both the first identity and the second identity over a base station indicated by network-controlled cell change.

7. The user equipment device of claim 1, wherein the communication controller is configured, upon determining that the operative signalling connection with the second SIM is lost, to determine and provide to the base station node communication capability information associated with only the first SIM.

8. The user equipment device of claim 1, comprising a wireless-communication interface for establishing the operative signalling connection with the second SIM, wherein the wireless-communication interface is connected with the communication controller.

9. A base station node for serving a user equipment device in a radio access network cell of a cellular radio communication system, the base station node comprising:
  a first base station control communication interface for exchanging mobility control information with one or more mobility management core network nodes of the cellular radio communication system for establishing, maintaining or terminating one or more radio bearers associated with at least one subscriber identity that is associated with a user equipment device;
  a second base station control communication interface for exchanging mobility control information with one or more user equipment devices of the cellular radio communication system for establishing, maintaining or terminating the one or more radio bearers associated with the at least one subscriber identity;
  a base-station control unit, which is configured, upon receiving via the first or second base-station control communication interface identity-bundling capability information that is associated with a first subscriber identity and with a second subscriber identity and that is indicative of a shared communication capability provided by the user equipment device via a RF front end of the user equipment device, to use the shared communication capability information in establishing, maintaining or terminating respective radio bearers associated with the first subscriber identity or with the second subscriber identity.

10. The base station node of claim 9, wherein the base-station control unit is configured to provide to the mobility management core network node via the first base-station control communication interface or to the user equipment device via the second base-station control communication interface an identity-bundling support capability indicator indicative of the capability of the base station node to control the shared use of the shared communication capability provided by the user equipment device.

11. A mobility management core network (MME) node for managing mobility of a user equipment device in a cellular radio communication system, comprising:
  a first MME-node control communication interface for exchanging mobility control information with a base station node of the cellular radio communication system for establishing, maintaining or terminating one or more radio bearers associated with a subscriber identity that is associated with a user equipment device;

a second MME-node control communication interface for exchanging mobility control information with one or more peer mobility management core network nodes of the cellular radio communication system for establishing, maintaining or terminating the one or more radio bearers;

a mobility control unit, which is configured, upon receiving via the first or second control communication interface identity-bundling capability information, which is indicative of a user equipment device being associated with a first subscriber identity and with a second subscriber identity and which is indicative of a shared communication capability provided by the user equipment device via its RF front end and associated with the first identity and with the second identity:

to associate the identity-bundling capability information with the first and second subscriber identities, with the user equipment device, and with the base station node; and to control shared use of the shared communication capability via the base station node and the RF front end of the user equipment device in establishing, maintaining or terminating respective radio bearers associated with the first subscriber identity and with the second subscriber identity, respectively.

12. The MME node of claim 11, wherein the mobility control unit is configured, upon receiving the identity-bundling capability information, to assign to the first and second subscriber identities respective serving temporary mobile subscriber identities, which comprise identity-bundling information indicative of the shared communication capability provided by the user equipment device via the RF front end and associated with the first subscriber identity and with the second subscriber identity.

13. The MME node of claim 11, wherein the mobility control unit is configured, in controlling a handover process involving a transfer of mobility control information from the MME node to a selected one of the peer mobility management core network nodes while the first or second identity is in an active mode, to provide to the selected one of the peer mobility management core network nodes the identity-bundling capability information associated with the first and second identity.

14. A method for operating a user equipment device, comprising:

establishing an operative signalling connection with a first subscriber identity module, herein SIM, which comprises first subscriber identity information associated with a first subscriber identity, herein first identity;

establishing an operative signalling connection with a second SIM, which comprises second subscriber identity information associated with a second subscriber identity, herein second identity, that is different from the first identity;

upon establishing the operative signalling connection with the second SIM, establishing an instance of a protocol stack and providing to the base station node identity-bundling capability information that is indicative of a shared communication capability provided by the user equipment device via the RF front end and associated with the first identity and with the second identity;

subsequently controlling shared use of the RF front end and shared use of the established instance of the protocol stack in establishing, maintaining and terminating respective radio bearers associated with the first identity and with the second identity, respectively via the base station node.

15. A method for operating a base station node in serving a user equipment device in a radio access network cell of a cellular radio communication system, the method comprising:

receiving identity-bundling capability information that is indicative of a shared communication capability provided by a user equipment device via its RF front end and a single instance of a protocol stack and that is associated with a first subscriber identity and with a second subscriber identity, using the shared communication capability provided by the user equipment device in establishing, maintaining or terminating respective radio bearers associated with the first subscriber identity and with the second subscriber identity, respectively.

16. A method for operating a mobility management core network (MME) node comprising:

receiving identity-bundling capability information, which is indicative of a user equipment device being associated with a first subscriber identity and with a second subscriber identity and which is indicative of a shared communication capability provided by the user equipment device via its RF front end and associated with the first identity and with the second identity, associating the identity-bundling communication capability information with the first and second subscriber identities, with the user equipment device, and with the base station node; and controlling shared use of the shared communication capability via the base station node and the RF front end of the user equipment device in establishing, maintaining or terminating respective radio bearers associated with the first subscriber identity and with the second subscriber identity, respectively.

* * * * *